(12) United States Patent
Higashihara et al.

(10) Patent No.: US 7,880,354 B2
(45) Date of Patent: Feb. 1, 2011

(54) SPINDLE MOTOR, INFORMATION RECORDING AND REPRODUCING APPARATUS THAT MAKES USE OF SAME, AND METHOD FOR MANUFACTURING SPINDLE MOTOR

(75) Inventors: Tetsuya Higashihara, Ehime (JP); Makoto Hasegawa, Tottori (JP); Kazuo Okubo, Ehime (JP)

(73) Assignee: Panasonic Corporation, Osaka (JP)

( * ) Notice: Subject to any disclaimer, the term of this patent is extended or adjusted under 35 U.S.C. 154(b) by 128 days.

(21) Appl. No.: 12/256,013

(22) Filed: Oct. 22, 2008

(65) Prior Publication Data
US 2009/0115275 A1 May 7, 2009

(30) Foreign Application Priority Data
Oct. 25, 2007 (JP) .............................. 2007-277328
Oct. 8, 2008 (JP) .............................. 2008-262277

(51) Int. Cl.
*H02K 5/16* (2006.01)
(52) U.S. Cl. ....................................................... 310/90
(58) Field of Classification Search ................... 310/90; 384/100
See application file for complete search history.

(56) References Cited

U.S. PATENT DOCUMENTS 7,088,023 B1 * 8/2006 Gomyo et al. ................ 310/90
2008/0024024 A1 * 1/2008 Tamaoka ..................... 310/90

FOREIGN PATENT DOCUMENTS

JP 2005-163903 6/2005
JP 2007-116796 5/2007

* cited by examiner

*Primary Examiner*—Hanh N. Nguyen
(74) *Attorney, Agent, or Firm*—Wenderoth, Lind & Ponack, L.L.P.

(57) ABSTRACT

A spindle motor, comprising a base having a cylindrical drawn portion formed by plastic working, a sleeve that is inserted in the drawn portion, a shaft that is inserted in a state of being rotatable relative to the sleeve, and a lubricant that fills the gap between the sleeve and the shaft, in which the sleeve is affixed with an adhesive agent to the drawn portion inner periphery, wherein there are adhesive reservoirs around the inner periphery of the drawn portion. These adhesive reservoirs are formed during a series of plastic working steps in which the cylindrical drawn portion is formed.

8 Claims, 11 Drawing Sheets

SPINDLE MOTOR, INFORMATION RECORDING AND REPRODUCING APPARATUS THAT MAKES USE OF SAME, AND METHOD FOR MANUFACTURING SPINDLE MOTOR

BACKGROUND OF THE INVENTION

1. Field of the Invention

The present invention relates to a spindle motor that is installed in a hard disk drive (hereinafter referred to as HDD apparatus) or another such information recording and reproducing apparatus, to an information recording and reproducing apparatus in which this spindle motor is used, and to a method for manufacturing a spindle motor.

2. Description of the Related Art

HDD apparatuses are used in portable music players, portable telephones, and so forth, not to mention in personal computers. Therefore, HDD apparatuses and the spindle motors installed in these HDD apparatuses need to be thin and compact, and also need vibration resistance, impact resistance, and so forth.

Figure 9:
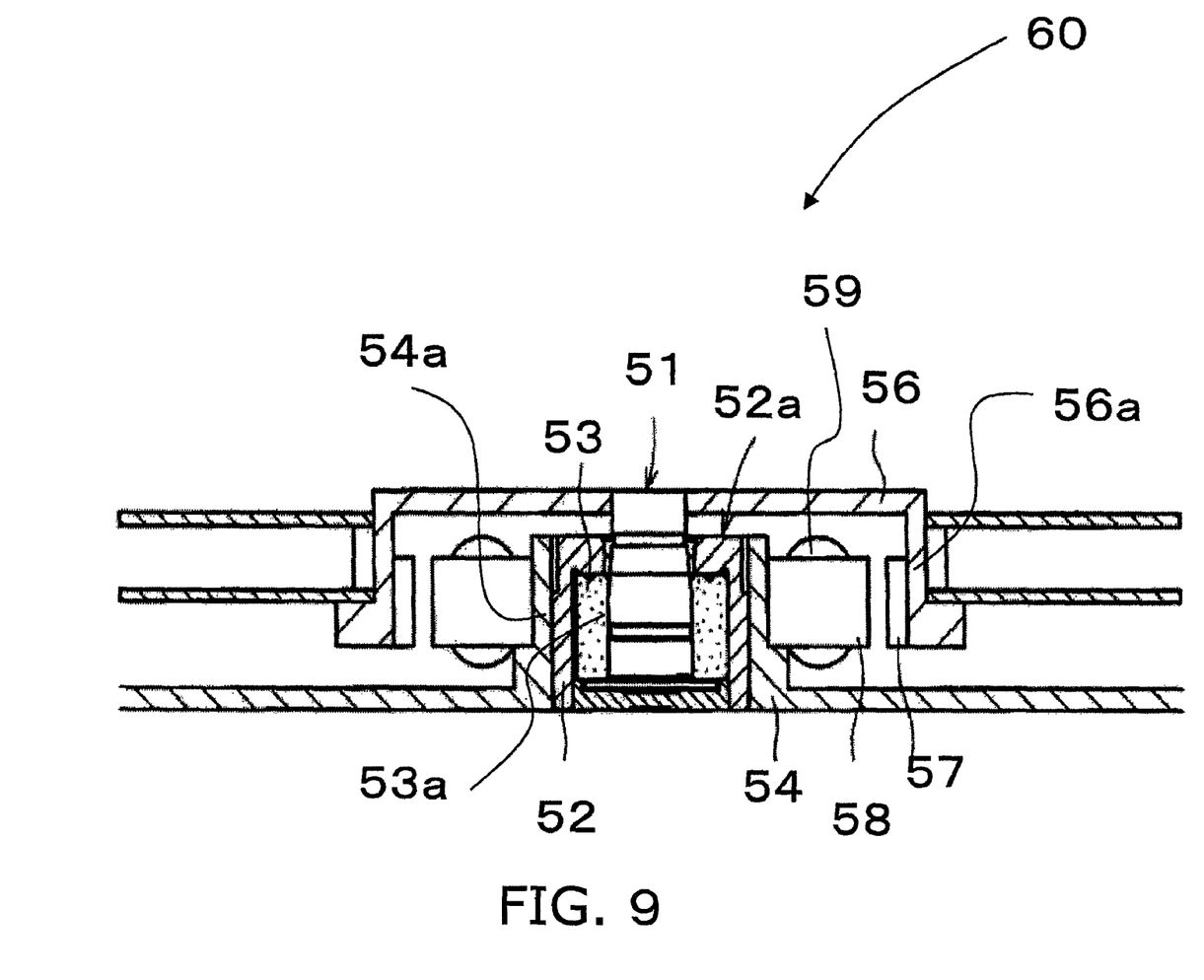
FIG. 9 is a cross section of a conventional spindle motor.

FIG. 9 shows the configuration of a conventional spindle motor 60. As shown in FIG. 9, a cylindrical convex portion 54a is formed on a base 54. A stator core 58 around which a coil 59 is wound is attached to the outer periphery of the cylindrical convex portion 54a. A substantially cylindrical housing 52 formed by cutting is fixed to the inner periphery of the cylindrical convex portion 54a of the base 54 by crimping, adhesive bonding, or the like. The housing 52 has a stepped portion 52a on its inner periphery. A sleeve 53 is positioned and affixed by an adhesive agent on the inner periphery of the housing 52. The sleeve 53 is provided with a bearing hole 53a in which a shaft 51 is inserted in a rotatable state. A substantially cup-shaped rotor hub 56 is attached to one end of the shaft 51. A rotor magnet 57 is attached to the inner periphery of an outer peripheral wall portion 56a of the rotor hub 56 at a location opposite the stator core 58 attached to the base 54, with a constant gap in between in the radial direction.

With the spindle motor 60 configured as above, when electrical power is sequentially applied so that a rotational magnetic field is generated in the coil 59 wound around the stator core 58, the rotor magnet 57 receives the rotational force, and the shaft 51 and the rotor hub 56 to which the rotor magnet 57 is fixed rotate.

With this spindle motor 60, in the following Japanese Laid-Open Patent Application 2005-163903, for example, in between the inner peripheral surface of the housing 52 and the outer peripheral surface of the sleeve 53 are provided an adhesive reservoir and a holder for holding the two with interference. As a result, the components can be tacked without curing the adhesive agent by positioning and fixing with the holder, and the fixing strength of the two can be ensured by catching sufficient adhesive agent in the reservoir.

Also, in Japanese Laid-Open Patent Application 2007-116796, a plurality of recessed portions extending in the rotational axis direction are provided between the motor base and the sleeve. As a result, there is no deformation of the hydrodynamic groove that is formed, and the fixing strength of the two can be ensured.

SUMMARY OF THE INVENTION

However, as discussed above, improvements in impact resistance are needed as information recording and reproducing apparatuses become more portable, and this requires higher strength than in the past. Also, as information recording and reproducing apparatuses become more popular, lower cost is desired. With the conventional configurations discussed above, in Japanese Laid-Open Patent Application 2005-163903 recessed portions have to be worked in the inner peripheral surface of the housing 52 in order to affix the sleeve 53, and in Japanese Laid-Open Patent Application 2007-116796 recessed portions have to be worked in the motor base in order to affix the sleeve. These recessed portions are provided partially at about four locations, and do not serve to increase the strength uniformly overall. Also, this working entails a separate step when metal materials are involved, impact resistance cannot be greatly increased, and production efficiency is low.

In view of this, it is an object of the present invention to provide a spindle motor with enhanced impact resistance and higher production efficiency.

The spindle motor according to the first aspect of the invention comprises a base, an adhesive reservoir, a sleeve, a shaft, and a lubricant. The base has a cylindrical drawn portion whose working hardness (extent of work hardening) varies in an axial direction.

The adhesive reservoir is provided for holding an adhesive agent, and is formed on the inner peripheral surface of the drawn portion and work hardened. The sleeve is inserted in the inner peripheral surface of the drawn portion and affixed with the adhesive agent. The shaft is inserted in a state of being rotatable relative to the sleeve. The lubricant fills the gap between the sleeve and the shaft.

The phrase "work hardened" here refers to a situation in which hardness is increased by plastic deformation when a metal is subjected to stress (work hardening). When the cylindrical drawn portion is formed by plastic working such as press working, the work hardened increases in proportion to the extent of deformation. Therefore, the extent of the work hardening of the drawn portion varies in the axial direction. Also, the adhesive reservoir is similarly formed by plastic working prior to the drawing of the base, and at least partly of it is work hardened.

The spindle motor according to the second aspect of the invention is the spindle motor according to the first aspect of the invention, wherein a plurality of the adhesive reservoirs are formed along the entire inner peripheral surface of the drawn portion.

The spindle motor according to the third aspect of the invention is the spindle motor according to the first aspect of the invention, wherein a plurality of the adhesive reservoirs are formed along the axial direction and a circumferential direction of the inner peripheral surface.

The spindle motor according to the fourth aspect of the invention is the spindle motor according to the first aspect of the invention, wherein the adhesive reservoir has a polygonal shape in planar view. Also it may have a polyhedral shape in stereoscopic view.

The spindle motor according to the fifth aspect of the invention is the spindle motor according to the first aspect of the invention, wherein the adhesive reservoir is substantially circular in shape.

The spindle motor according to the sixth aspect of the invention is the spindle motor according to the first aspect of the invention, wherein the adhesive reservoir has a plurality of recessed portions formed along the entire inner peripheral surface of the drawn portion, and at least one groove formed all the way around the inner peripheral surface of the drawn portion in the circumferential direction.

The spindle motor according to the seventh aspect of the invention is the spindle motor according to the first aspect of the invention, wherein the adhesive reservoir progressively deepens from the base side of the drawn portion toward its distal end side.

The term "base side" here means the closed end side of the sleeve, and "distal end" means the end on the opposite side form the closed end.

The spindle motor according to the eighth aspect of the invention is the spindle motor according to the first aspect of the invention, wherein a plurality of the adhesive reservoirs are formed, with the spacing in the axial direction narrowing toward the distal end side of the drawn portion.

The spindle motor according to the ninth aspect of the invention is the spindle motor according to the first aspect of the invention, wherein a plurality of the adhesive reservoirs are formed, with the spacing in the circumferential direction of the inner peripheral surface narrowing toward the distal end side of the drawn portion.

The information recording and reproducing apparatus according to the tenth aspect of the invention has installed in it the spindle motor according to the first aspect of the invention.

The method for manufacturing a spindle motor according to the eleventh aspect of the invention is a method for manufacturing a spindle motor comprising a base having a cylindrical drawn portion, an adhesive reservoir that is formed on the inner peripheral surface of the drawn portion and holds an adhesive agent, and a sleeve that is inserted in the inner peripheral surface of the drawn portion and affixed with the adhesive agent, said method comprising a first step and a second step. In the first step, an adhesive reservoir is formed by press working around the periphery that will become the drawn portion. In the second step, a drawn portion is formed by drawing after the first step.

Here, the adhesive reservoir and the drawn portion are finished by continuous press working.

The method for manufacturing a spindle motor according to the twelfth aspect of the invention is the method for manufacturing a spindle motor according to the eleventh aspect of the invention, wherein, in the first step, the depth of the adhesive reservoir progressively increases moving away from the center of the drawn portion.

The method for manufacturing a spindle motor according to the thirteenth invention is the method for manufacturing a spindle motor according to the eleventh invention, wherein, in the first step, a flat shape is formed such that the width of the adhesive reservoir in the circumferential direction around the center of the drawn portion progressively decreases moving away from the center of the drawn portion.

The method for manufacturing a spindle motor according to the fourteenth aspect of the invention is the method for manufacturing a spindle motor according to the eleventh aspect of the invention, wherein, in the first step, the spacing of the adhesive reservoirs in the circumferential direction around the center of the drawn portion progressively increases moving away from the center of the drawn portion.

The spindle motor according to the fifteenth aspect of the invention comprises a base, an adhesive reservoir, a sleeve, a shaft, and a lubricant. The base has a drawn portion formed by press working. The adhesive reservoir provided for holding an adhesive agent, is formed on an inner peripheral surface of the drawn portion and is formed during a series of press working in which the drawn portion is formed. The sleeve is inserted in the inner peripheral surface of the drawn portion and affixed with the adhesive agent. The shaft is inserted in a state of being rotatable relative to the sleeve. The lubricant fills the gap between the sleeve and the shaft.

As discussed above, with the present invention, a drawn portion that is the fixed component of a sleeve, and an adhesive reservoir formed around the inner periphery thereof are formed on a base continuously by press working or other such plastic working, which provides a spindle motor with increased impact resistance and higher production efficiency, and an information recording and reproducing apparatus equipped with this spindle motor.

DETAILED DESCRIPTION OF THE INVENTION

Embodiments of a spindle motor 20 of the present invention, an information recording and reproducing apparatus typified by a hard disk device 80, and a method for manufacturing the same will now be described in detail through reference to FIGS. 1 to 4.

Embodiment 1

Figure 1:
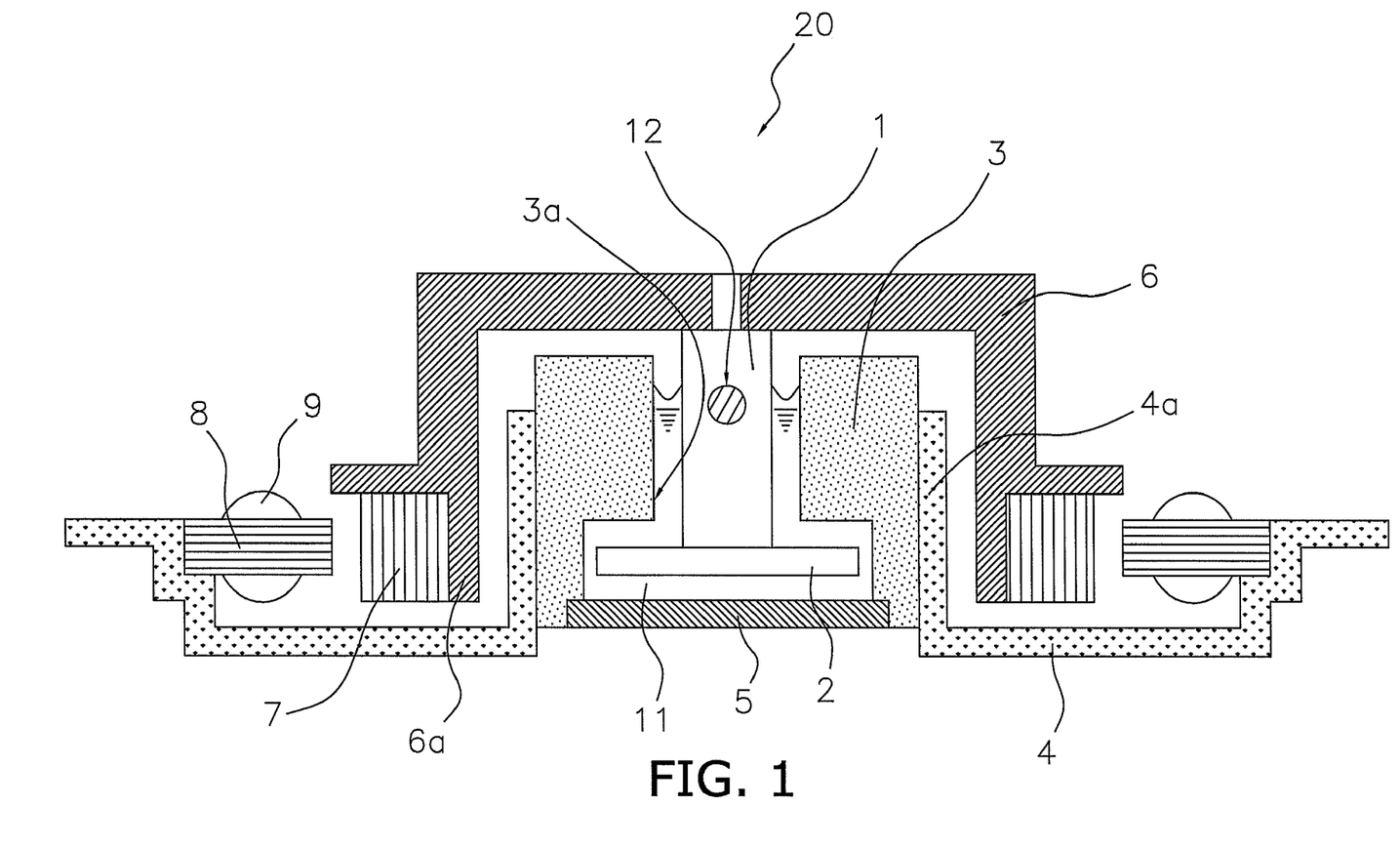
FIG. 1 is a cross section of the spindle motor in Embodiment 1 of the present invention.
Figure 2:
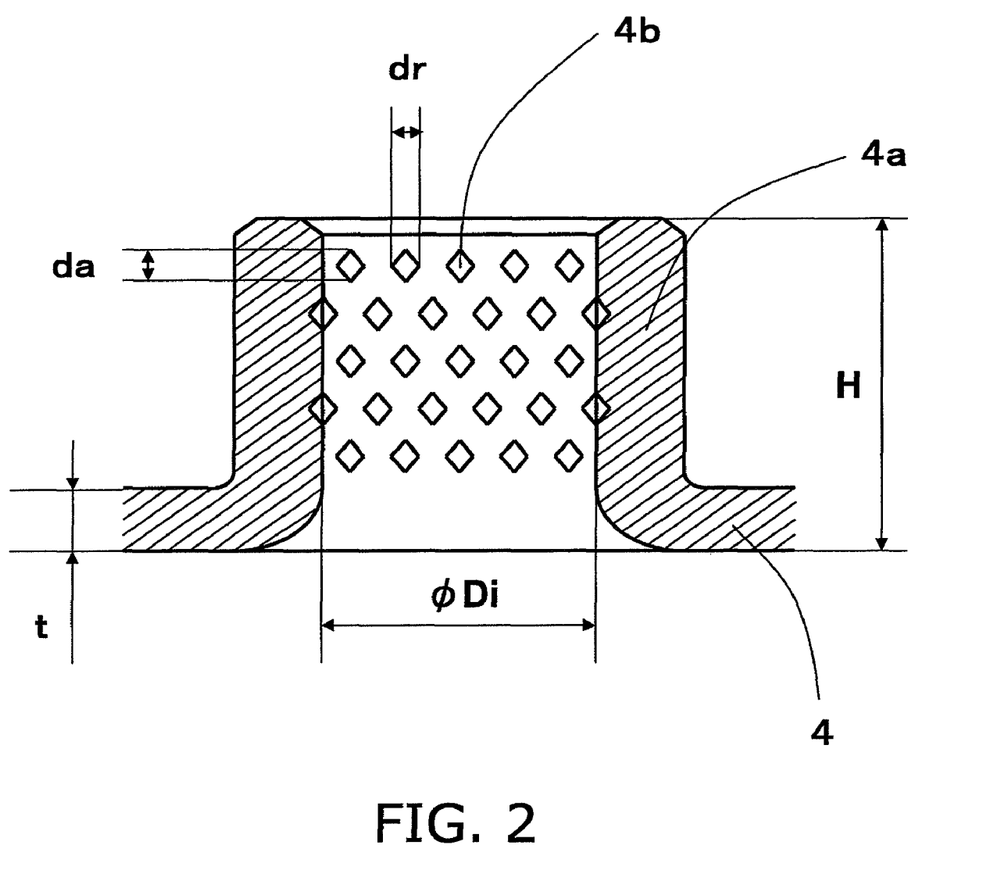
FIG. 2 is a cross section of the inner periphery of the cylindrical drawn portion of the base in Embodiment 1 of the present invention.

FIG. 1 is a cross section of the spindle motor 20 in Embodiment 1 of the present invention. FIG. 2 is a detail view of the inner periphery of the drawn portion formed in a cylindrical shape on a base 4 in Embodiment 1 of the present invention.

In the description of this embodiment, for the sake of convenience the up and down direction in the drawings will be referred to as the "axial direction upper side," "axial direction lower side," and so forth, but this is not intended to limit the actual state of attachment of the spindle motor 20.

As shown in FIG. 1, the base 4 has a cylindrical drawn portion 4a formed by press working. A stator core 8 around which a coil 9 is wound is attached to the outer periphery of the cylindrical drawn portion 4a. As shown in FIG. 2, the base 4 here has, for example, a sheet thickness t of approximately 0.6 mm, is made from SPCE, and its front and back sides have undergone electroless nickel plating or the like. The dimensions of the cylindrical drawn portion 4a are, for example, an inside diameter φ Di of approximately 7.9 mm, and a protruding height H of approximately 3 mm.

As shown in FIG. 1, a cylindrical sleeve 3 is positioned and affixed by an adhesive agent to the inner periphery of the cylindrical drawn portion 4a of the base 4. The sleeve 3 is provided with a circular bearing hole 3a in which a cylindrical shaft 1 is inserted in a rotatable state. A radial hydrodynamic groove is formed in a herringbone pattern, for example, in either the outer periphery of the shaft 1 or the inner periphery of the bearing hole 3a of the sleeve 3, constituting a radial bearing portion.

A disk-shaped thrust plate 5 that blocks off one end of the bearing hole 3a is affixed to the sleeve 3 at the end face on the axial direction lower side by adhesive bonding, crimping, welding, etc.

Further, a disk-shaped flange 2 is attached to the end face on the axial direction lower side of the shaft 1. A thrust hydrodynamic groove is formed in a herringbone pattern, for example, in the face of the flange 2 opposite the thrust plate 5 and/or the face of the thrust plate 5 on the shaft 1 side, constituting a thrust bearing portion. Here, the flange 2 may be formed integrally on the end face on the axial direction lower side of the shaft 1. Also, a thrust hydrodynamic groove may be formed in a herringbone pattern, for example, in the face of the flange 2 opposite the sleeve 3 and/or the lower end face of the sleeve 3, constituting a thrust bearing portion.

The gap formed by the shaft 1 and the bearing hole 3a of the sleeve 3, and the gap formed by the flange 2 and the thrust plate 5 are at least filled with a lubricant 11. Oil, superfluid grease, an ionic liquid, or the like can be applied, for example, as the lubricant 11 here.

A substantially inverted cup-shaped rotor hub 6 is attached to one end of the shaft 1 on the axial direction upper side. A rotor magnet 7 is attached to the outer periphery of a cylindrical hanging wall 6a of the rotor hub 6, at a location opposite the stator core 8 attached to the base 4, with a constant gap in between in the radial direction.

As shown in FIG. 2, recessed portions (adhesive reservoirs) 4b are formed in the inner periphery of the cylindrical drawn portion 4a of the base 4. The dimensions of these recessed portions 4b are, in FIG. 2 for example, an axial direction dimension da of 0.1 to 0.3 mm and a circumferential direction dimension dr of 0.1 to 0.3 mm. These recessed portions 4b usually do not pass through in the axial direction. The outer periphery of the sleeve 3 is fixed with an adhesive agent to the inner periphery of the cylindrical drawn portion 4a of the base 4. However, it is extremely important for the sleeve 3 shown in FIG. 1 to have good attachment accuracy, such as its positional accuracy or squareness (for example, the attachment accuracy in the height direction with respect to the base 4 needs to be within a few dozen microns). Therefore, there are strict restrictions on the gap at the joint between the two, and the gap for holding the adhesive agent must be reduced. On the other hand, to ensure impact resistance against falling, etc., the adhesive agent must be held properly between the two so that adhesive strength is ensured.

In view of this, as shown in FIG. 2, in this embodiment the adhesive reservoirs are provided by forming the recessed portions 4b around the entire inner periphery of the cylindrical drawn portion 4a of the base 4, so that a sufficient quantity of adhesive agent can be caught and held between the base 4 and the sleeve 3.

Since the recessed portions (adhesive reservoirs) 4b are formed ahead of time by plastic working such as press working, rolling, or shot blasting prior to subjecting the base material to drawing, the strength of at least part of the recessed portions shape (such as the side wall faces) is increased by work hardening. Furthermore, since drawing is performed after this step, the strength of the inner peripheral surface of the cylindrical drawn portion 4a is also increased by work hardening. The extent of work hardening of the inner peripheral surface of the cylindrical drawn portion 4a at this point varies in the axial direction. Thus, the strength of the entire cylindrical drawn portion 4a, including the recessed portions 4b, can be increased, which contributes to higher impact resistance. Also, the formation of the recessed portions 4b and the formation of the cylindrical drawn portion 4a can be accomplished by a series of plastic working, and this contributes to higher productivity. Also, since the recessed portions 4b are formed over the entire inner peripheral surface of the cylindrical drawn portion 4a, uneven coating is prevented, and this contributes to a more airtight seal by adhesive bonding.

Here, the recessed portions 4b shown in FIG. 2 are, for example, substantially diamond-shaped recessed portions disposed in a plurality of rows all the way around the inner periphery of the cylindrical drawn portion 4a. As shown in FIG. 2, a cross section of these recessed portions 4b has a shape obtained by working with a tool (die or punch), for example, whose tip or point is in the form of a quadrangular pyramid. The recessed portions 4b has a diamond shape in planar view. The recessed portions are not limited to this shape, and may have a shape obtained by working with a tool whose tip is conical, or by working with a tool whose tip is hemispherical. A tool in the form of any polyhedral pyramid may also be used. The various examples of shapes of the recessed portions 4b can be generically considered as point-shaped. Furthermore, the positions of the recessed portions 4b are determined regularly along the axial direction of the cylindrical drawn portion 4a in FIG. 2, or along the circumferential direction. However, as long as the surface area of the recessed portions 4b per unit of surface area is equal, they do not necessarily have to be arranged regularly in the axial direction or the circumferential direction.

With Embodiment 1 given above, since a suitable amount of adhesive agent can be caught and held between the base 4 and the sleeve 3, the adhesive strength provided by the adhesive agent can be high and stable, so a spindle motor 20 can be provided with excellent vibration resistance and impact resistance.

In the description of Embodiment 1, as shown in FIG. 1, the hole through which the shaft 1 was inserted into the sleeve 3 in a rotatable state was the bearing hole 3a, and one end was blocked off by the thrust plate 5, but other options are also possible. For instance, it is possible to employ a bottomed cylindrical shape that does not go all the way through, in which the shaft 1 is inserted into the sleeve 3 in a rotatable state.

Next, the procedure for forming the cylindrical drawn portion 4a having the recessed portions 4b on the base 4 will be described.

Figure 3:
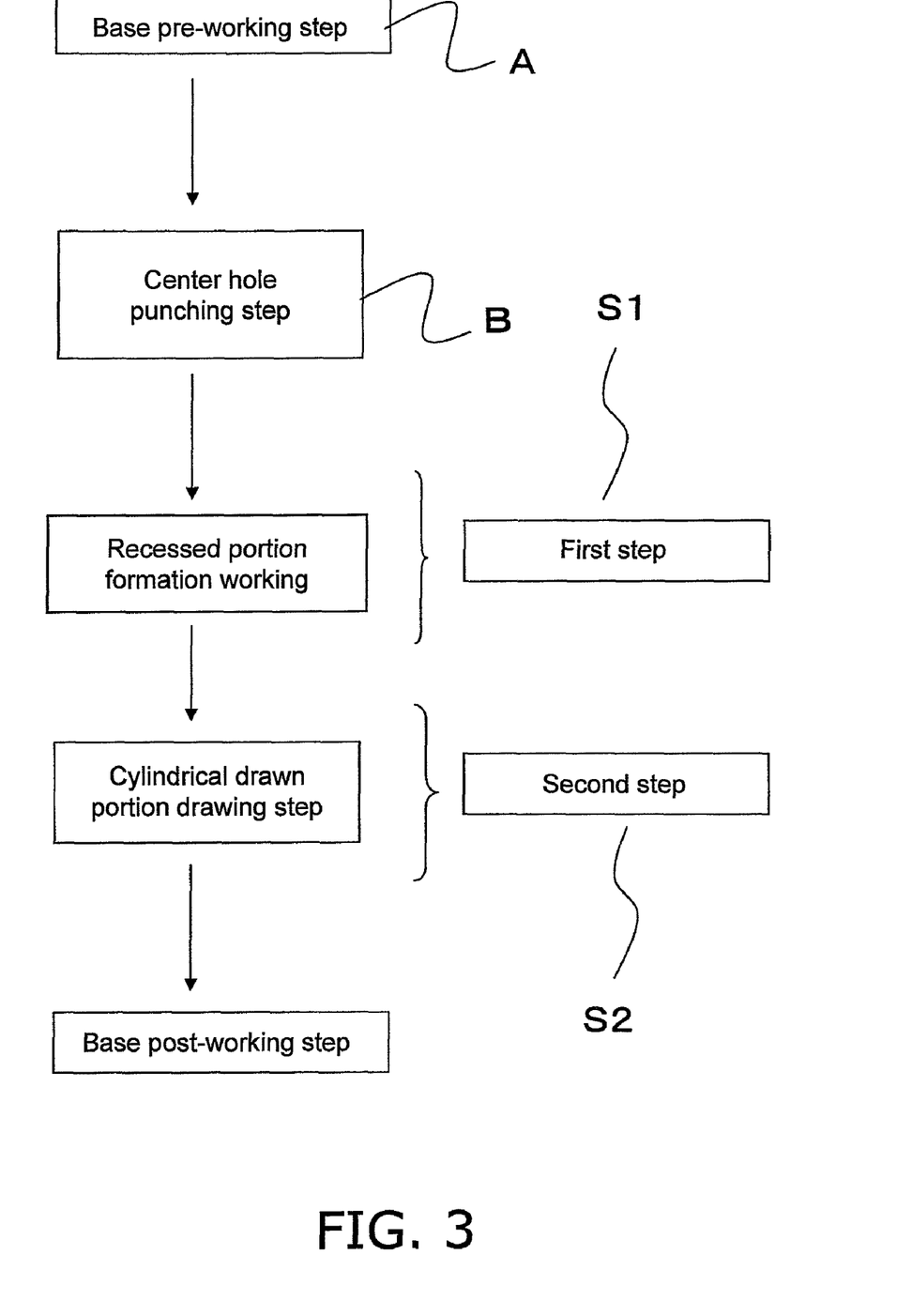
FIG. 3 is a flowchart of the method for manufacturing the base in Embodiment 1 of the present invention.

As shown in FIG. 3, first the base 4 is worked in a preliminary step A, and a circular hole 4c (see FIG. 7 for 4c) that serves as the center hole of the cylindrical drawn portion 4a is punched out in a step B, taking care not to produce burrs or warping. This center hole may have already been formed in a preliminary step. As a first step S1, the recessed portions 4b are formed by forming process around the circular hole 4c. Here, a protrusion corresponding to the shape of the recessed portions 4b is provided to a die or punch, and the punch or die is then used to strike the workpiece to form the recessed portions 4b.

Next, as the second step S2, the flat sheet is progressively drawn up around the center of the circular hole 4c while taking the draw ratio into account (referring to Romanovsky's optimal draw ratio, etc.), forming the cylindrical drawn portion 4a. These steps can be carried out continuously by press working. Here, the punching that forms the circular hole 4c in the flat sheet in the first step S1 may be performed after the recessed portions 4b are formed in the area around this hole. Also, other steps may be performed between the first step S1 and the second step S2.

However, if the procedure is such that the circular hole 4c is formed first and then the recessed portions 4b are formed around it, any distortion or warping of the base 4 that occurs when the circular hole 4c is formed can be corrected by the subsequent formation of the recessed portions 4b, the effect of which is to ensure flatness with a high degree of accuracy.

The above steps can be carried out by a continuous press working step, so there is no need for a separate step for forming the recessed portions 4b, allowing the spindle motor 20 to be provided with high production efficiency. As a result, the production quantity is larger, manufacturing costs can be lowered, product quality is more consistent, and an inexpensive spindle motor 20 can be provided.

Embodiment 2

Figure 4:
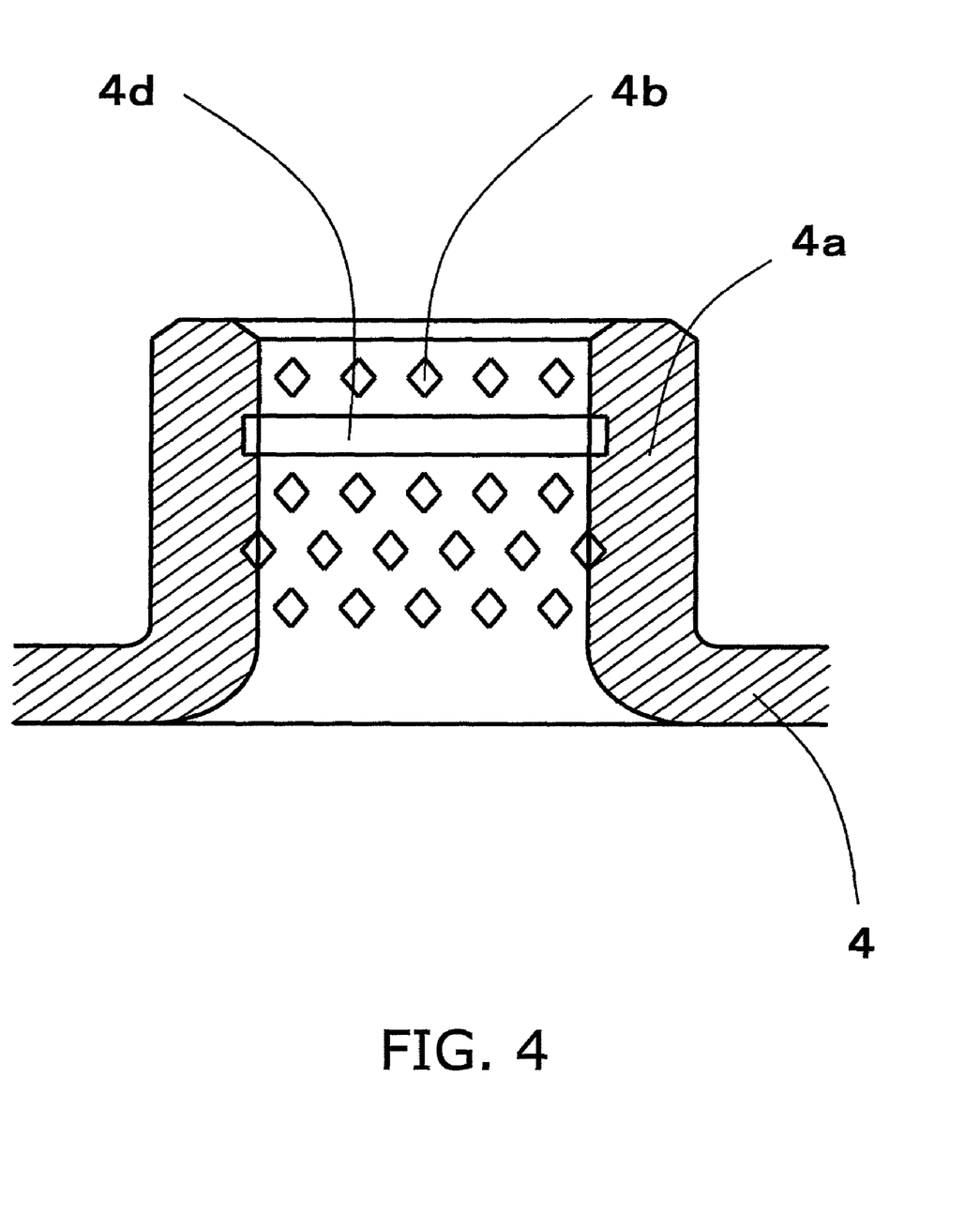
FIG. 4 is a cross section of the inner periphery of the cylindrical drawn portion of the base in Embodiment 2 of the present invention.

As shown in FIG. 4, the recessed portions 4b described in Embodiment 1 and at least one adhesive groove (adhesive reservoir) 4d provided all the way around the inner periphery of the cylindrical drawn portion 4a may be formed in the inner periphery of the cylindrical drawn portion 4a in the circumferential direction. Here, the adhesive groove 4d is not worked in a separate step as in the past, but rather is worked simultaneously with the formation of the recessed portions 4b, or during a series of press working. The size of the adhesive groove 4d is, for example, approximately 0.1 to 0.3 mm.

As shown in FIG. 1, in the rotor portion made up of the rotor hub 6, the rotor magnet 7, and the shaft 1, the center of gravity 12 thereof is located at the top (in the axial direction) of the cylindrical drawn portion 4a provided to the base 4. Therefore, providing the position of the adhesive groove 4d to the upper part of the cylindrical drawn portion 4a in the axial direction ensures a large surface area of the adhesive reservoir at the top in the axial direction, the adhesive strength near the center of gravity 12 of the rotor portion is higher than that of the bottom (in the axial direction) of the cylindrical drawn portion 4a, and this effectively ensures good adhesive strength, so the impact resistance and other aspects of reliability of the spindle motor 20 are enhanced.

Figure 5A:
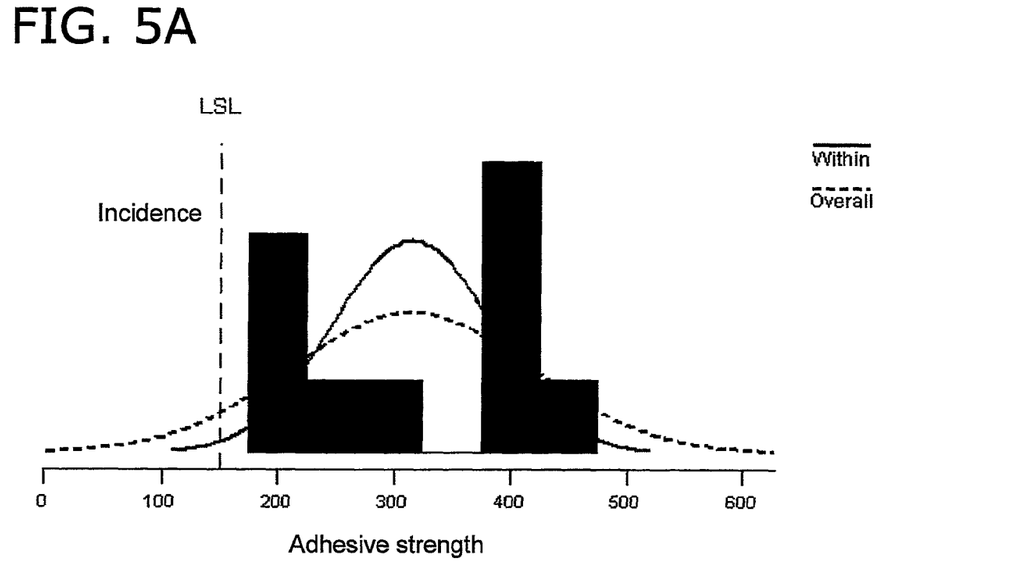
FIG. 5A is a graph of variance data for adhesive strength in Embodiment 2 of the present invention.
Figure 5B:
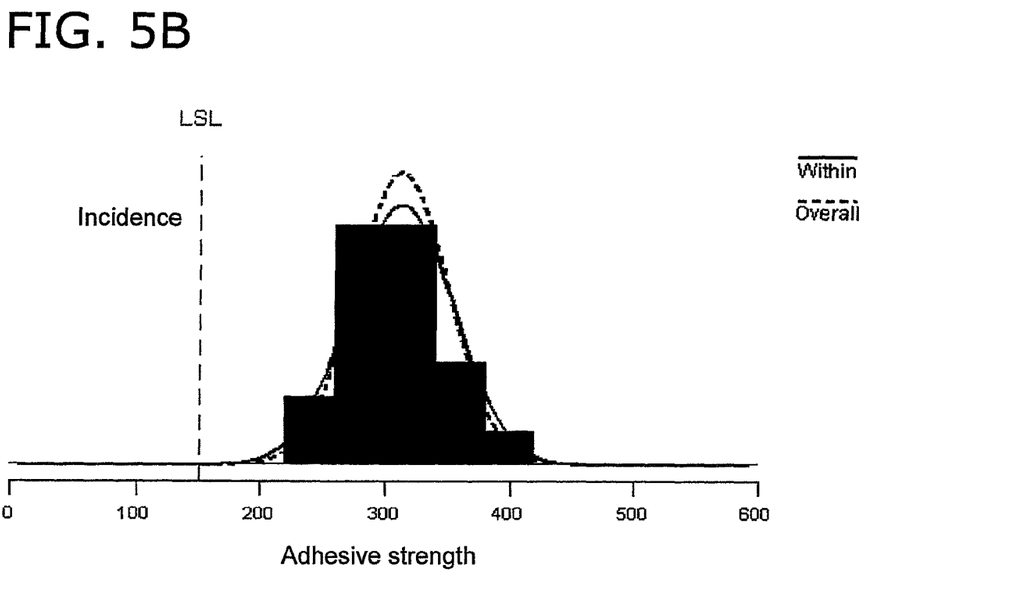
FIG. 5B is a graph of variance data for adhesive strength in Embodiment 2 of the present invention.
Figure 10:
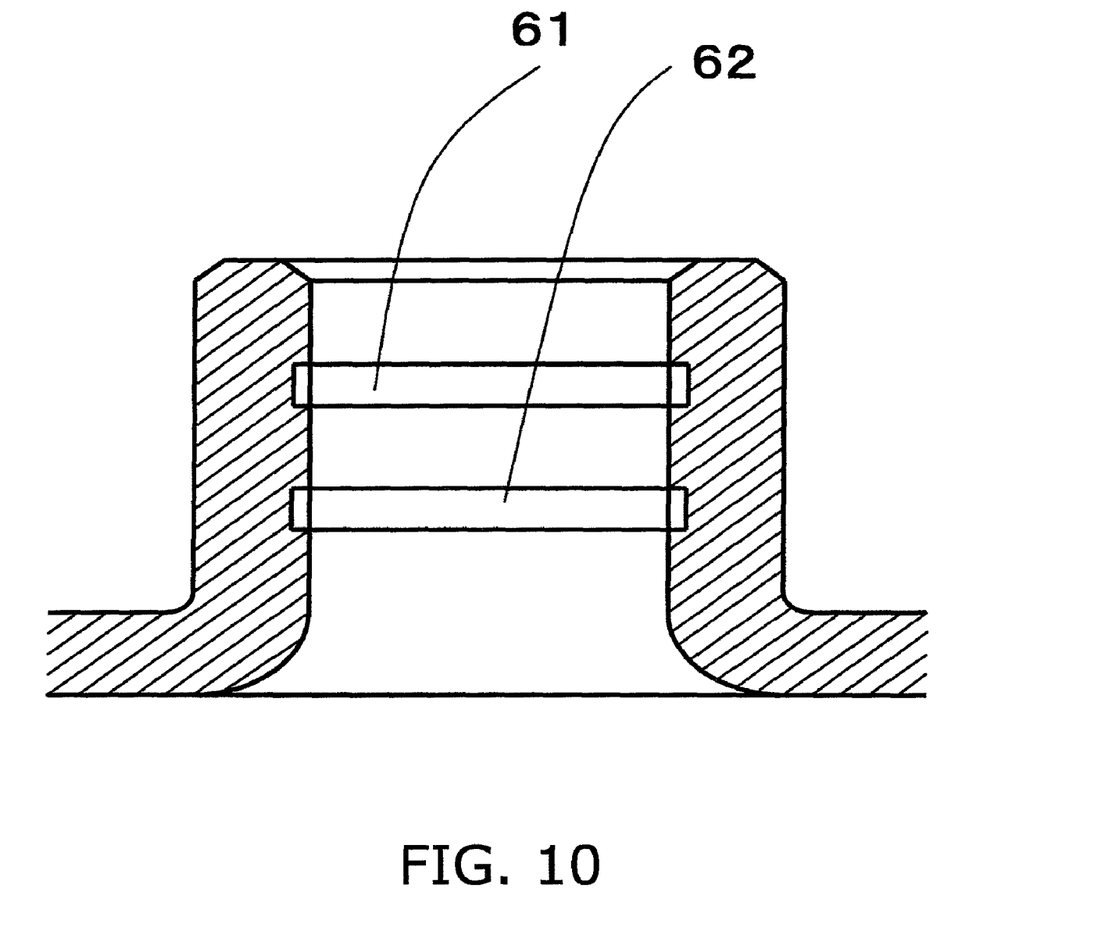
FIG. 10 is a cross section of the inner periphery of the cylindrical drawn portion of a conventional base.

As shown in FIGS. 5A and 5B, with this Embodiment 2, it was confirmed experimentally that variance in adhesive strength in manufacturing lots was lower than with a conventional consisting entirely of adhesive grooves. FIG. 5A is a graph of the adhesive strength distribution when using just the conventional consisting entirely of adhesive grooves 61 and 62 shown in FIG. 10, and FIG. 5B is a graph of the adhesive strength distribution when combining the recessed portions 4b and the adhesive groove 4d given in this Embodiment 2. In FIGS. 5A and 5B, the vertical axis is the incidence, the horizontal axis is the adhesive strength, the solid lines are normal distribution approximation lines based on the latent process capability index, and the broken lines are normal distribution approximation lines based on the overall process capability index.

Here, the surface area of the adhesive grooves 61 and 62 in FIG. 10 is set to be substantially equal to the combined surface area of the adhesive groove 4d and the recessed portions 4b shown in FIG. 4. The average value for adhesive strength (ave) here is substantially equal, but the variance in adhesive strength (std) in manufacturing lots is greatly reduced (to approximately one-third in this example).

Embodiment 3

Figure 6:
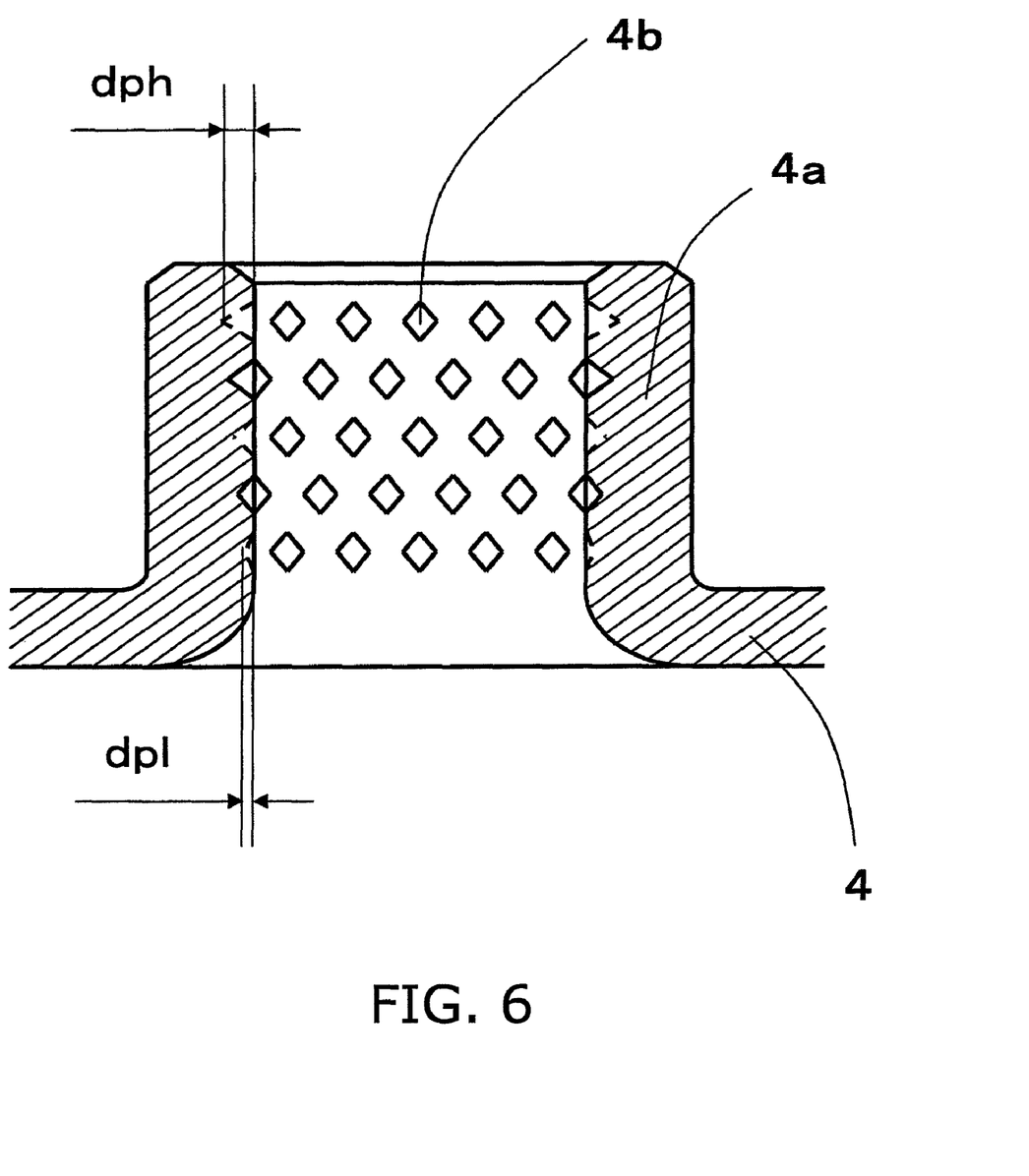
FIG. 6 is a cross section of the inner periphery of the cylindrical drawn portion of the base in Embodiment 3 of the present invention.

As shown in FIG. 6, the depth of the recessed portions 4b formed in the inner periphery of the cylindrical drawn portion 4a may progressively increase from the base side of the drawn portion 4a (the lower side in the drawing) toward its distal end side (the upper side in the drawing). More specifically, as shown in FIG. 6, the relationship between the depth dpl on the base side of the cylindrical drawn portion 4a after drawing and the depth dph on the distal end side of the cylindrical drawn portion 4a is as follows.

$$dph > dpl$$

Here, the deeper are the recessed portions 4b, the more adhesive agent they will be able to catch, so the adhesive strength can be increased by the wedge effect of the adhesive agent. As shown in FIG. 1, the center of gravity 12 of the rotor portion is located on the upper side in the axial direction of the cylindrical drawn portion 4a provided to the base 4, so the higher up in the axial direction of the cylindrical drawn portion 4a, the stronger the bonding needs to be. Accordingly, adopting the mode discussed above makes it possible to bond the upper portion in the axial direction of the cylindrical drawn portion 4a, where adhesive strength is needed, more strongly than the lower portion in the axial direction. Meanwhile, it is better for the depth dpl of the recessed portions 4b on the base side to be shallower. In FIG. 6, the direction in which the sleeve 3 is inserted for adhesive fixing is from the distal end side of the cylindrical drawn portion 4a, and since the adhesive agent coats the distal end side entirely so as to be squeezed by the outer peripheral surface of the sleeve 3, the amount of adhesive decreases moving toward the base side. Here, if the depth dpl of the recessed portions 4b on the base side is the same as the depth dph of the recessed portions 4b on the distal end side, the recessed portions 4b on the base side will be less likely to be filled with adhesive agent, and the adhesive wedge effect will not be obtained. Thus, if the depth of the recessed portions 4b is progressively reduced from the distal end side toward the base side (or from the sleeve 3 insertion side toward the opposite side), the adhesive agent will fill the recessed portions 4b and its wedge effect can be fully realized. As a result, the adhesive strength of the sleeve 3 with respect to the cylindrical drawn portion 4a can be effectively ensured, so impact resistance and other aspects of reliability can be increased in the spindle motor 20.

Embodiment 4

Figure 7A:
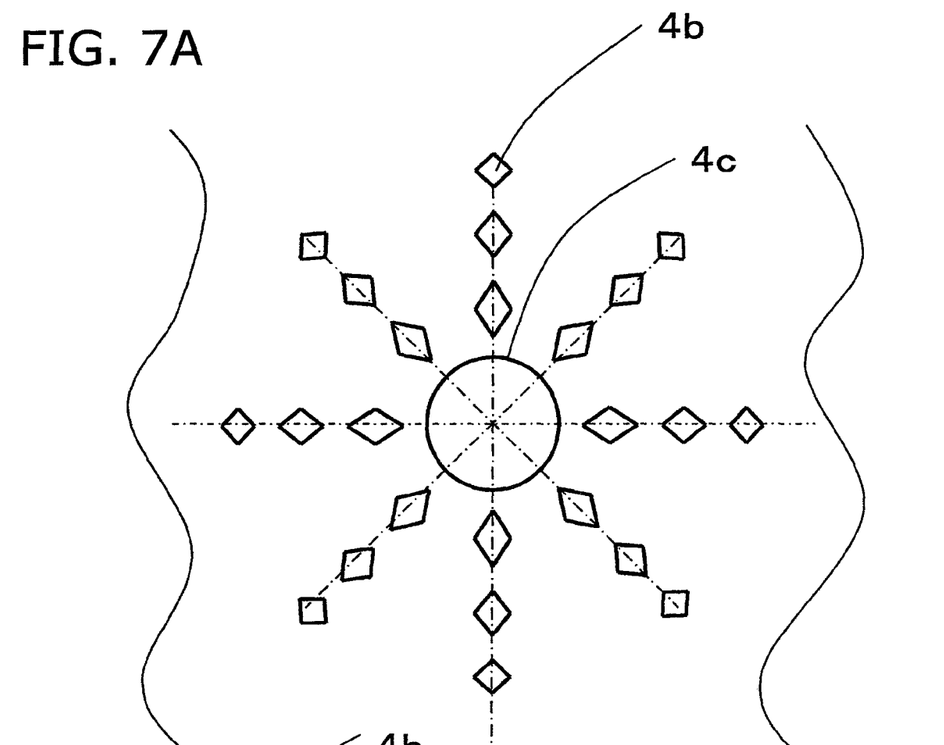
FIG. 7A is a plan view during the formation of the recessed portions in the base in Embodiment 4 of the present invention.
Figure 7B:
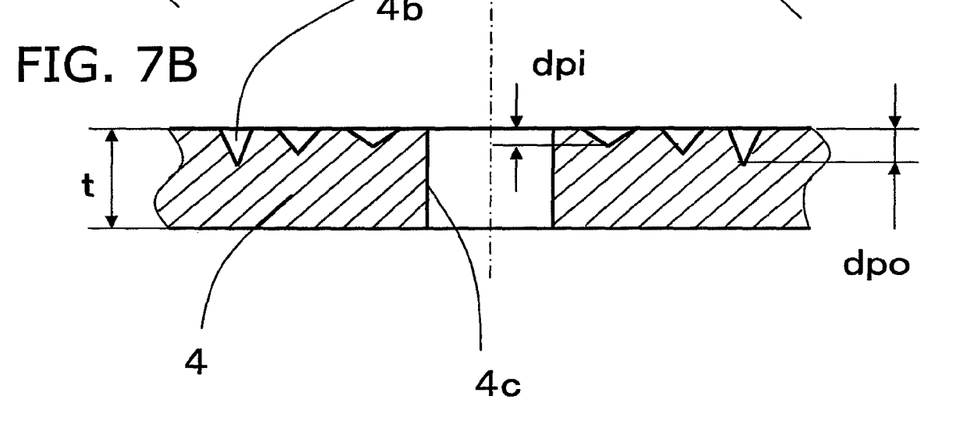
FIG. 7B is a cross section during the formation of the recessed portions in the base in Embodiment 4 of the present invention.

As shown in FIGS. 7A and 7B, in the working of the pre-drawing recessed portions formed in the inner periphery of the cylindrical drawn portion 4a, for example, the recessed portions 4b worked around the circular hole 4c in the first step S1 may be formed so that their depth progressively increases moving away from the center of the circular hole 4c. More specifically, as shown in FIG. 7B, the relationship between the depth dpo of the recessed portions 4b on the outer peripheral side and the depth dpi of the recessed portions 4b on the inner peripheral side is as follows.

$$dpo > dpi$$

Here, when the cylindrical drawn portion 4a is worked in the second step S2, the cylindrical drawn portion 4a is formed while the thickness of the base 4 is stretched out in the thickness direction of the material. Accordingly, after the second step S2, the depth of the recessed portions 4b near the bottom of the cylindrical drawn portion 4a is less than the depth prior to press working. This is because the material tends in particular to be stretched out more thinly near the bottom of the cylindrical drawn portion 4a. In view of this, in the mode given above, that is, when the recessed portions 4b are made deeper near the bottom of the cylindrical drawn portion 4a ahead of time, the depth of the recessed portions 4b can be kept within the specified range even after the working of the cylindrical drawn portion 4a. This means that after drawing, the depth of the recessed portions 4b formed in the inner periphery of the cylindrical drawn portion 4a can be kept substantially the same all the way from near the bottom to near the distal end. As a result, the adhesive strength produced by the adhesive agent can be more uniform and stable over the entire inside of the cylindrical drawn portion 4a.

Embodiment 5

Figure 8:
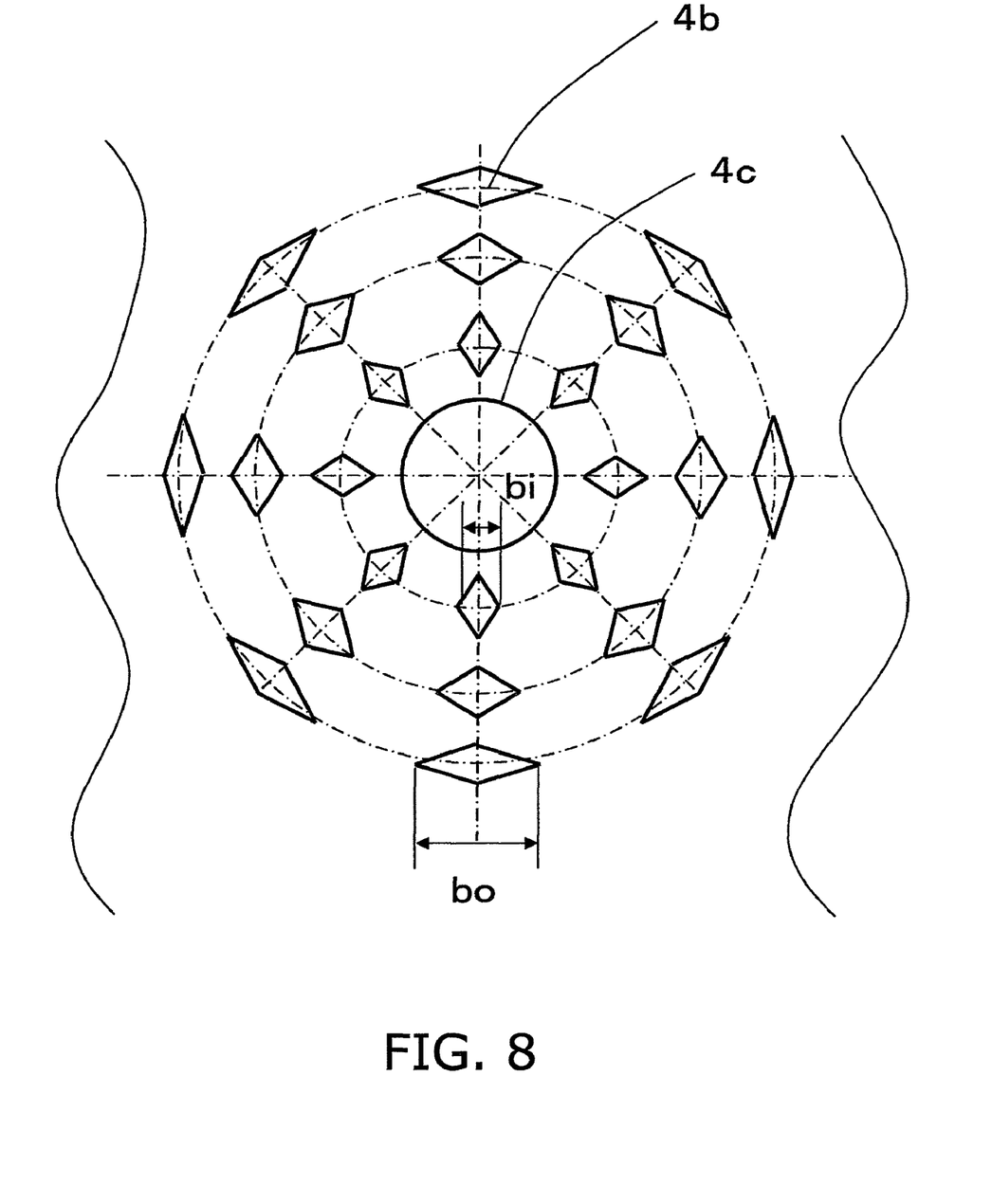
FIG. 8 is a plan view during the formation of the recessed portions in the base in Embodiment 5 of the present invention.

As shown in FIG. 8, in the working of the recessed portions formed in the inner periphery of the cylindrical drawn portion 4a, when the protrusion height after drawing is approximately 3 mm from the flat sheet of the base 4, for example, the recessed portions 4b worked around the circular hole 4c in the first step S1 may be formed in a flat shape such that the width in the circumferential direction with respect to the center of the circular hole 4c progressively increases moving away from the center of the circular hole 4c. More specifically, as shown in FIG. 8, the relationship between the width bo in the circumferential direction of the recessed portions 4b on the outer peripheral side and the width bi in the circumferential direction of the recessed portions 4b on the inner peripheral side is as follows.

bo>bi

Here, when the cylindrical drawn portion 4a is worked in the second step S2, the cylindrical drawn portion 4a is formed while the thickness of the base 4 is stretched out in the thickness direction of the material. Accordingly, after the second step S2, the width bi in the circumferential direction of the circular hole 4c of the recessed portions 4b near the distal end of the cylindrical drawn portion 4a is greater than the width before press working. In view of this, in the mode given above, that is, when the width bi is reduced in the circumferential direction of the recessed portions 4b near the distal end of the cylindrical drawn portion 4a ahead of time, the desired shape for the recessed portions 4b can be ensured after the cylindrical drawn portion 4a has been worked in the second step S2. As a result, the adhesive strength produced by the adhesive agent can be more uniform and stable over the entire face.

Embodiment 6

As shown in FIGS. 7 and 8, in the working of the recessed portions formed in the inner periphery of the cylindrical drawn portion 4a, the recessed portions 4b worked around the circular hole 4c in the first step S1 may be formed so that the spacing at which they are disposed in the circumferential direction with respect to the center of the circular hole 4c progressively increases moving away from the center of the circular hole 4c.

Here, when the cylindrical drawn portion 4a is worked in the second step S2, the cylindrical drawn portion 4a is formed while the thickness of the base 4 is stretched out in the circumferential direction of the circular hole 4c. Accordingly, after the second step S2, the spacing in the circumferential direction of the circular hole 4c of the recessed portions 4b near the distal end of the cylindrical drawn portion 4a is more spread out than before press working. In view of this, in the mode given above, that is, when the spacing in the circumferential direction of the recessed portions 4b near the distal end of the cylindrical drawn portion 4a is made to be closer together ahead of time, the recessed portions 4b can be disposed at the desired density ever after the cylindrical drawn portion 4a has been worked in the second step S2. As a result, the shape after drawing can be kept stably at substantially the same shape, and this stabilizes the adhesive strength produced by the adhesive agent.

In the second step S2, the drawing stage is divided up into a plurality of steps after taking into account the draw ratio in order to keep the circularity and squareness of the cylindrical drawn portion 4a of the base 4 within the desired ranges. This ensures the accuracy that is ultimately required, and lessens the internal stress produced by working, thereby suppressing splitting, cracking, and so forth.

The operation of the spindle motor 20 in Embodiments 2 to 6 is the same as that described in the Description of the Related Art above, and was therefore not discussed again.

As discussed above, with an embodiment of the present invention, the recessed portions 4b are provided over the entire inner peripheral part of the cylindrical drawn portion 4a, in a form that does not pass through in the axial direction, thereby forming adhesive reservoirs, and furthermore, the cylindrical drawn portion 4a and the recessed portions 4b are formed continuously by press working of the base 4, so adequate adhesive strength is ensured in the base 4 and the sleeve 3, and production efficiency can be increased.

Embodiment 7

As described in Embodiment 3, adhesive strength increases the closer the location is to the center of gravity of the rotor hub 6, so it is preferable to increase the adhesive reservoir formation density on the distal end side (or on the sleeve 3 insertion side). More specifically, the closer the location is to the distal end side, the narrower is the axial direction spacing in the layout of the adhesive reservoirs. Alternatively, the closer the location is to the distal end side, the narrower is the circumferential direction spacing in the layout of the adhesive reservoirs.

Adhesive reservoirs can be ensured even if the recessed portions 4b provided to the inner periphery of the cylindrical drawn portion 4a of the base 4 in this embodiment are provided to the outer periphery of the sleeve 3.

Figure 11:
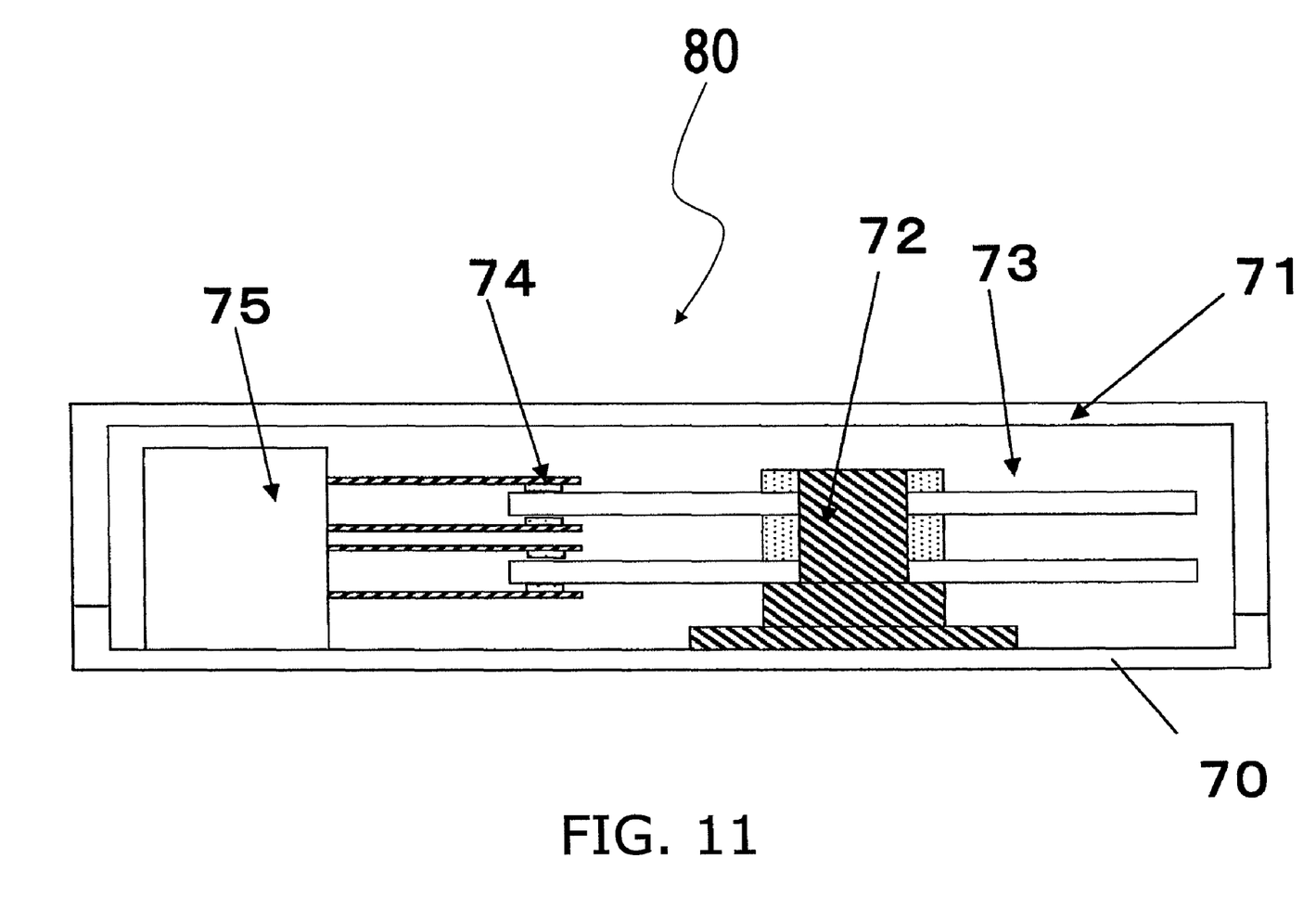
FIG. 11 is a simplified diagram of an information recording and reproducing apparatus.

As shown in FIG. 11, the hard disk device 80 generally comprises housings 70 and 71 whose shape is rectangular, etc., a spindle motor 72 disposed in the interior of the housings 70 and 71, a magnetic recording disk or other such circular disk 73 capable of recording information and which is mounted on the spindle motor 72, and a head movement mechanism 75 having a magnetic head 74 to reading and writing information from and to the disk 73.

The present invention is not limited to the hard disk device 80 discussed above, and can also be applied to an optical disk apparatus, an magneto optical disk apparatus, or another such information recording and reproducing apparatus having a rotating mechanism, or an information processing device such as an MPU fan motor used as a personal computer MPU cooling apparatus.

The spindle motor, information recording and reproducing apparatus, and method for manufacturing the same according to the present invention can provide a spindle motor with high production efficiency, and are useful as a spindle motor that is installed in an information recording and reproducing apparatus typified by a hard disk device or the like.

The invention claimed is:

1. A spindle motor, comprising:
   a base having a cylindrical drawn portion, said cylindrical drawn portion having an inner peripheral surface;
   an adhesive reservoir holding an adhesive agent, said adhesive reservoir having a plurality of point-shaped recessed portions distributed over said inner peripheral surface of said drawn portion;
   a sleeve inserted in said drawn portion and affixed to said inner peripheral surface with said adhesive agent;
   a shaft inserted so as to be in a state of being rotatable relative to said sleeve; and
   a lubricant that fills a gap between said sleeve and said shaft.

2. The spindle motor according to claim 1,
   wherein said plurality of point-shaped recessed portions is formed along an entirety of said inner peripheral surface of said drawn portion.

3. The spindle motor according to claim 1,
   wherein said plurality of point-shaped recessed portions is formed along the axial direction and a circumferential direction of said inner peripheral surface.

4. The spindle motor according to claim 1,
   wherein each of said plurality of point-shaped recessed portions has a planar shape that is a polygonal shape.

5. The spindle motor according to claim 1,
   wherein each of said plurality of point-shaped recessed portions has a planar shape that is a substantially circular shape.

6. The spindle motor according to claim 1,
   wherein said adhesive reservoir has at least one annular groove formed entirely around said inner peripheral surface of said drawn portion in the circumferential direction.

7. The spindle motor according to claim 1,
   wherein each of said plurality of point-shaped recessed portions progressively deepens from a base side of said drawn portion toward a distal end side of said drawn portion.

8. An information recording and reproducing apparatus, in which the spindle motor according to claim 1 is installed.

* * * * *